(12) United States Patent
Cheung et al.

(10) Patent No.: US 10,862,988 B2
(45) Date of Patent: Dec. 8, 2020

(54) ON-DEMAND REAL-TIME SENSOR DATA DISTRIBUTION SYSTEM

(71) Applicant: The Chinese University of Hong Kong, Shatin (HK)

(72) Inventors: Waiman Cheung, Shatin (HK); Sung-Chi Chu, Sai Kung (CN); Chun Yip Leung, Tuen Mun (CN); Kwong Man Cheng, Mei Foo (CN)

(73) Assignee: The Chinese University of Hong Kong, New Territories (HK)

( * ) Notice: Subject to any disclaimer, the term of this patent is extended or adjusted under 35 U.S.C. 154(b) by 49 days.

(21) Appl. No.: 15/846,088

(22) Filed: Dec. 18, 2017

(65) Prior Publication Data
US 2019/0190999 A1    Jun. 20, 2019

(51) Int. Cl.
| | | |
|---|---|---|
| H04L 29/08 | (2006.01) | |
| G06K 7/10 | (2006.01) | |
| H04L 29/06 | (2006.01) | |
| H04L 12/24 | (2006.01) | |

(52) U.S. Cl.
CPC .......... *H04L 67/26* (2013.01); *G06K 7/10366* (2013.01); *H04L 67/12* (2013.01); *H04L 41/22* (2013.01); *H04L 67/42* (2013.01)

(58) Field of Classification Search
CPC ......... H04L 67/26; H04L 67/12; H04L 67/42; H04L 41/22; G06K 7/0366
See application file for complete search history.

(56) References Cited

U.S. PATENT DOCUMENTS

| | | | | |
|---|---|---|---|---|
| 7,200,132 | B2* | 4/2007 | Twitchell, Jr. | ..... G06K 7/10108 370/338 |
| 7,319,397 | B2* | 1/2008 | Chung | .................... B60R 25/00 340/572.4 |
| 8,223,012 | B1 | 7/2012 | Diem | |

(Continued)

OTHER PUBLICATIONS

Leung, et al., "A Proposed Cross Platform Privacy and Security Framework for Supply Chain Information Sharing," The 9th International Conference on Electronic Business, Macau, Nov. 30-Dec. 4, 2009, 1-7.

(Continued)

*Primary Examiner* — Blake J Rubin
(74) *Attorney, Agent, or Firm* — Kilpatrick Townsend & Stockton LLP

(57) ABSTRACT

Methods and systems for operating a sensor network are provided. In one example, a server may provide graphical data representing a hierarchical sensor network for displaying at a client device. The server may receive a selection to display sensor data from a first node of the nodes of the hierarchical sensor network and determine, based on the selection, a hierarchical sensor label associated with one or more first sensors of the hierarchical sensor network corresponding to the first node. The server may also receive a plurality of messages including sensor data generated by a plurality of sensors of the hierarchical sensor network from an in-bound real-time message processor, and identify a first set of messages based on the hierarchical sensor label. The server may extract the sensor data from the first set of messages and provide the sensor data for displaying at the client device.

25 Claims, 10 Drawing Sheets

Hierarchical organization tree 200

(56) References Cited

U.S. PATENT DOCUMENTS

| | | | |
|---|---|---|---|
| 8,285,838 B2* | 10/2012 | Rehman | H04L 12/6418 709/220 |
| 8,311,904 B2 | 11/2012 | Steinbach et al. | |
| 8,321,308 B2 | 11/2012 | Podhajsky et al. | |
| 8,493,207 B2 | 7/2013 | Diem | |
| 8,610,530 B2 | 12/2013 | Singh et al. | |
| 8,671,035 B2 | 3/2014 | Bold et al. | |
| 8,732,095 B2 | 5/2014 | Cornford | |
| 8,958,779 B2 | 2/2015 | Ramer et al. | |
| 9,003,499 B2 | 4/2015 | Diem | |
| 9,037,859 B2 | 5/2015 | O'Brien et al. | |
| 9,066,849 B2 | 6/2015 | Fung et al. | |
| 9,071,931 B2 | 6/2015 | Diem | |
| 9,123,031 B2 | 9/2015 | Marshall et al. | |
| 9,125,170 B2 | 9/2015 | Varsavsky Waisman-Diamond | |
| 9,135,481 B2 | 9/2015 | Wilkinson | |
| 9,219,741 B2 | 12/2015 | Dabbiere et al. | |
| 9,258,765 B1* | 2/2016 | daCosta | H04W 40/24 |
| 9,381,139 B2 | 7/2016 | Fung et al. | |
| 9,392,012 B2 | 7/2016 | Becker et al. | |
| 9,414,623 B2 | 8/2016 | Minvielle | |
| 9,418,263 B2 | 8/2016 | Butler et al. | |
| 9,426,162 B2 | 8/2016 | Dabbiere et al. | |
| 9,495,395 B2 | 11/2016 | Chan et al. | |
| 9,524,231 B2 | 12/2016 | Ellis et al. | |
| 9,542,577 B2 | 1/2017 | Butler et al. | |
| 9,592,964 B2* | 3/2017 | Gollu | G05B 15/02 |
| 9,704,122 B2* | 7/2017 | Jung | G06Q 50/02 |
| 9,716,641 B2* | 7/2017 | Kalkunte | H04L 41/0816 |
| 10,270,875 B1* | 4/2019 | Kuo | H04L 67/2833 |
| 10,503,784 B1* | 12/2019 | Dean | H04L 67/10 |
| 2007/0159304 A1* | 7/2007 | Agarwal | G06K 7/0008 340/10.32 |
| 2007/0282988 A1* | 12/2007 | Bornhoevd | H04L 67/125 709/223 |
| 2009/0024584 A1* | 1/2009 | Dharap | G06F 15/177 |
| 2009/0096608 A1* | 4/2009 | Rehman | G06Q 10/06 340/572.1 |
| 2009/0135000 A1* | 5/2009 | Twitchell, Jr. | G06Q 10/08 340/539.1 |
| 2009/0307255 A1* | 12/2009 | Park | G06Q 10/10 |
| 2010/0070425 A1 | 3/2010 | Cornford | |
| 2010/0082292 A1* | 4/2010 | Pantaleano | G06N 5/02 702/182 |
| 2010/0293493 A1* | 11/2010 | Khazanov | G05B 23/0264 715/771 |
| 2012/0041851 A1 | 2/2012 | Tan | |
| 2012/0197911 A1* | 8/2012 | Banka | H04L 67/12 707/752 |
| 2012/0212331 A1 | 8/2012 | Jones et al. | |
| 2013/0060351 A1* | 3/2013 | Imming | H04W 4/029 700/13 |
| 2013/0099901 A1 | 4/2013 | Jones et al. | |
| 2013/0337477 A1 | 12/2013 | Kuhr et al. | |
| 2014/0039964 A1 | 2/2014 | Sengupta | |
| 2014/0136233 A1 | 5/2014 | Atkinson et al. | |
| 2014/0136273 A1 | 5/2014 | Bolene et al. | |
| 2014/0156348 A1 | 6/2014 | Sinkel | |
| 2014/0156472 A1 | 6/2014 | Stuntebeck et al. | |
| 2014/0266614 A1 | 9/2014 | Wilkinson | |
| 2014/0379296 A1* | 12/2014 | Nathan | G06Q 10/08 702/150 |
| 2015/0019291 A1 | 1/2015 | Gershenson et al. | |
| 2015/0026622 A1* | 1/2015 | Roaldson | G06F 3/0484 715/771 |
| 2015/0035833 A1* | 2/2015 | Hao | G06T 11/206 345/440 |
| 2015/0120373 A1 | 4/2015 | Bajaj et al. | |
| 2015/0123794 A1 | 5/2015 | Hämäläinen et al. | |
| 2015/0128279 A1 | 5/2015 | Becker et al. | |
| 2015/0186693 A1 | 7/2015 | Blair et al. | |
| 2015/0186834 A1 | 7/2015 | Mickles et al. | |
| 2015/0215280 A1 | 7/2015 | Chang et al. | |
| 2015/0227526 A1 | 8/2015 | France-Prouvoste | |
| 2015/0242773 A1 | 8/2015 | Major et al. | |
| 2015/0256623 A1* | 9/2015 | Ryhorchuk | H04L 67/12 709/217 |
| 2015/0286933 A1* | 10/2015 | Trivelpiece | G06N 5/027 706/47 |
| 2015/0341981 A1* | 11/2015 | Gallo | H04W 84/18 702/188 |
| 2015/0363615 A1 | 12/2015 | Boudville | |
| 2015/0363730 A1* | 12/2015 | Crane, Jr. | G06Q 10/06315 705/7.25 |
| 2016/0003932 A1 | 1/2016 | Whitney et al. | |
| 2016/0042321 A1* | 2/2016 | Held | G06Q 10/08355 705/338 |
| 2016/0048709 A1 | 2/2016 | Butler et al. | |
| 2016/0110683 A1 | 4/2016 | Gupta et al. | |
| 2016/0132839 A1* | 5/2016 | Randolph | G06F 16/9537 705/305 |
| 2016/0142868 A1* | 5/2016 | Kulkarni | H01Q 1/24 455/456.5 |
| 2016/0191474 A1 | 6/2016 | Hinh | |
| 2016/0226305 A1 | 8/2016 | Estes | |
| 2016/0253622 A1* | 9/2016 | Sriram | G06Q 10/0833 713/179 |
| 2016/0275093 A1 | 9/2016 | Majoch et al. | |
| 2016/0283745 A1 | 9/2016 | LaFever et al. | |
| 2016/0297665 A1 | 10/2016 | Petermann | |
| 2016/0299826 A1* | 10/2016 | Engelhardt | G06F 11/3048 |
| 2016/0300171 A1 | 10/2016 | Boldrin et al. | |
| 2016/0306172 A1 | 10/2016 | Chestnut et al. | |
| 2016/0321480 A1 | 11/2016 | Hamlin et al. | |
| 2016/0335731 A1 | 11/2016 | Renalds | |
| 2016/0342818 A9 | 11/2016 | Jones et al. | |
| 2016/0345195 A1 | 11/2016 | Axmon et al. | |
| 2016/0358013 A1 | 12/2016 | Carter et al. | |
| 2016/0366543 A1 | 12/2016 | Berry | |
| 2016/0379288 A1 | 12/2016 | Wilkinson et al. | |
| 2016/0381536 A1 | 12/2016 | Li et al. | |
| 2017/0001653 A1* | 1/2017 | Ferencz, Jr. | B61L 3/127 |
| 2017/0004442 A1 | 1/2017 | Luke et al. | |
| 2017/0005717 A1 | 1/2017 | Berry | |
| 2017/0006135 A1 | 1/2017 | Siebel et al. | |
| 2017/0006140 A1 | 1/2017 | Park et al. | |
| 2017/0006348 A1 | 1/2017 | Hardt | |
| 2017/0006408 A1* | 1/2017 | Kim | H04L 67/12 |
| 2017/0011450 A1 | 1/2017 | Frager et al. | |
| 2017/0017909 A1 | 1/2017 | Srinivasan | |
| 2017/0085632 A1* | 3/2017 | Cardote | H04W 4/70 |
| 2017/0094376 A1* | 3/2017 | Trainor | H04Q 9/00 |
| 2017/0142539 A1* | 5/2017 | Gallo | H04Q 9/00 |
| 2017/0192628 A1* | 7/2017 | O'Connor | G05B 19/41885 |
| 2017/0315697 A1* | 11/2017 | Jacobson | G06F 16/26 |
| 2017/0357707 A1* | 12/2017 | Gleba | G06F 16/282 |
| 2017/0364320 A1* | 12/2017 | Elumalai | G05B 19/054 |
| 2018/0083836 A1* | 3/2018 | Kuo | H04L 12/281 |

OTHER PUBLICATIONS

Chu, et al., "On IOT Impact of Supply Chain Visibility," The Fifteenth International Conference on Electronic Business, Hong Kong, Dec. 6-10, 2015, 5 pages.

Chu, et al., "Visibility Cloud: A Supply Chain Perspective," The Fifteenth International Conference on Electronic Business, Hong Kong, Dec. 6-10, 2015, 6 pages.

Cheung, et al., "Security & Privacy for Supply Chain Data Sharing," Submitted to Hong Kong R&D Centre for Logistics & Supply Chain Management Enabling Technologies, Jan. 20, 2009, 121 pages.

Cheung, et al., "A Technology Roadmap for RFID Adoption in Supply Chain," Int. J. Electronic Business, 1999, 7:1, 15 pages.

* cited by examiner

ON-DEMAND REAL-TIME SENSOR DATA DISTRIBUTION SYSTEM

BACKGROUND

A sensor network may include distributed autonomous sensors. Uses of sensor networks include but are not limited to monitoring and control of a process, a machine, etc. A sensor in a sensor network is typically equipped with a communications interface, a controller, and an energy source (such as a battery). A sensor typically measures a physical quantity and converts it into a signal that a user or an instrument can read. For example, a sensor can measure ambient conditions (e.g., a temperature, a light intensity, etc.) in an environment. A sensor can also detect wireless stimulus signals (e.g., from an RFID tag) generated by other objects. Each sensor may automatically and continuously generate streams of data representing the measurement and/or detection results, and transmit the streams of data to a server (or other instrument) over the network. A user can then obtain the data from the server to, for example, perform additional analyses.

In a case where a large number of sensors is deployed, the sensors may transmit a large volume of sensor data to the server. The server may then transmit the sensor data to a user over a network. The large volume of sensor data can pose problems for the network and for the user. For example, transmission of large volume of sensor data can overwhelm the network, causing the network to delay or even forfeit the transmission of the sensor data to the user. Further, the user may also be overwhelmed by the sheer volume of the sensor data and cannot use the data effectively. Moreover, due to the delay in the network transmission of the sensor data, the user may receive stale (or otherwise not up-to-date) sensor data, which may further diminish the utility and value of the sensor data to the user.

BRIEF SUMMARY

To reduce the volume of sensor data transmitted by the sensor network, embodiments of the present disclosure can provide a scheme for deploying and organizing a sensor network in a hierarchy to allow selection of sensor(s) from which sensor data is to be received and processed. The hierarchy can be determined based on a target application of the sensor network. Embodiments can also provide a graphical user interface to display the sensor network hierarchy (either part of the network or the entirety of the network) as in the form of a tree structure, and can allow a user to select, from the sensors represented in the tree, one or more sensors from which to receive sensor data. Embodiments can also provide a sensor data dispatcher to transmit real-time sensor data from the selected sensors for displaying in the graphical user interface.

By organizing a sensor network in a hierarchical form based on a target application of the data samples and displaying the hierarchical form graphically as a tree, embodiments of the present disclosure can provide an intuitive and efficient way for a user to select which sensor(s) to provide the sensor data. As an illustrative example, in a case where the sensor network is to monitor an object processed by a set of industrial processes (each of which may include a set of sub-processes), the sensor network may be deployed across a set of locations where the industrial processes and sub-processes occur; and the sensor network may be organized to reflect the hierarchical relationships between the industrial processes and sub-processes. A user can navigate the tree representing the sensor network hierarchy using the graphical user interface to pin point (identify) a process and/or a sub-process of interest, and select the sensor(s) to provide sensor data related to the process and/or sub-process of interest. With such arrangements, the user can select to receive the sensor needed and not to receive other sensor data, which not only improves user experience but also reduces the likelihood of wasting precious network and computing resources for sensor data that the user does not need.

In some embodiments, the sensor data generated by a particular sensor can be associated with a hierarchical label that reflects a relationship between the sensor and the sensor network hierarchy. The label may enable the sensor data dispatcher to transmit or drop the sensor data to the user based on a selection of the user at the graphical user interface. For example, the graphical user interface can generate a hierarchical label that reflects the sensor selected by the user from the sensor network hierarchy, and transmit the label to the sensor data dispatcher. The sensor data dispatcher can maintain a list of labels selected by the user (and by other users), and forward (or drop) sensor data received from the sensors if the associated label can be found in the list of labels.

In some embodiments, the sensor data dispatcher may interface with (or be part of) a real-time messaging system to transmit the sensor data in real-time messages to the user, to reduce the delay in transmitting the sensor data to the user. Moreover, the sensor data dispatcher and the real-time messaging system can also form an asynchronous system, in which the sensor data dispatcher can push the sensor data to a group of users who selected to receive the sensor data without the group of users making requests for the messages. All these can improve the efficiency of transmitting the sensor data over the network and can improve user experience.

Other embodiments are directed to systems, portable consumer devices, and computer readable media associated with methods described herein.

A better understanding of the nature and advantages of embodiments of the present disclosure may be gained with reference to the following detailed description and the accompanying drawings.

DETAILED DESCRIPTION

Embodiments of the present disclosure provide on-demand visibility of real-time sensor data from a sensor network. The sensor network can be organized in a hierarchical form. A graphical user interface can be provided to present the sensor network hierarchy as a tree and to allow a user to select one or more sensors from the tree to receive sensor data. A sensor data dispatch can be provided to receive the sensor data from the sensor network, and transmit only the sensor data from the selected one or more sensors to the user. The transmission can be via a real-time messaging system and using multicast to a group of users.

I. Hierarchical Sensor Data Collection

A sensor network can be deployed for different applications, such as process monitoring and control, the monitoring and control of a machine, etc. The subject being monitored by the sensor network may include a hierarchy. For example, a process being monitored by including a set of sub-processes, each of which can be associated with and monitored by a sensor. As another example, a machine being automated can include a set of components, and each component may also include a set of sub-components. Each sub-component may also be monitored by a sensor. A sensor network deployed to monitor the sub-processes and sub-components of a subject can be organized to reflect the hierarchical structure of the subject. The organization can be reflected in the labels associated with each sensor in the sensor network.

Figure 1:
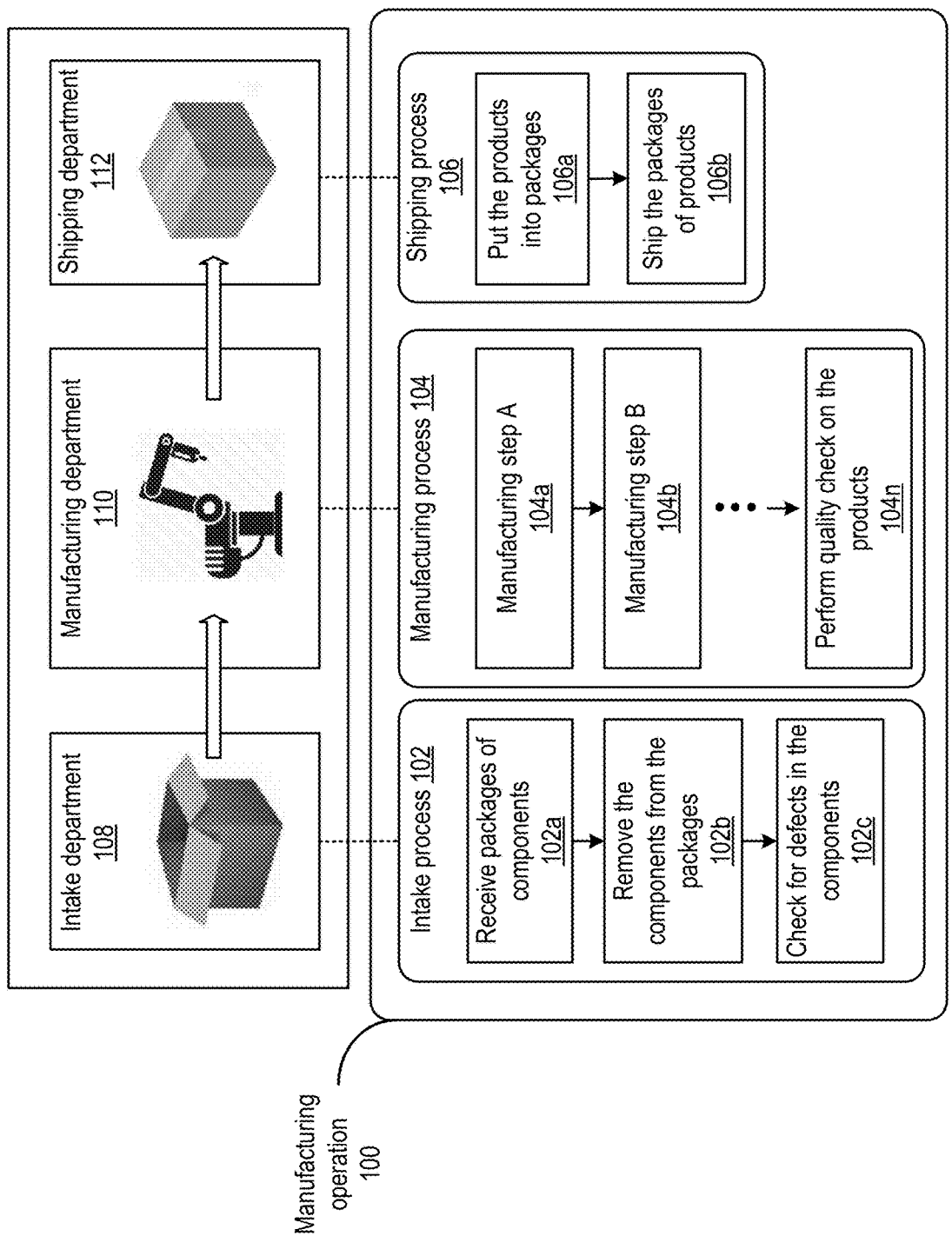
FIG. 1 illustrates an operation 100 for which embodiments of the present disclosure can be used.

FIG. 1 illustrates a manufacturing operation 100 for which embodiments of the present disclosure can be used. Manufacturing operation 100 may include a set of processes including an intake process 102 for receiving components, a manufacturing process 104 for manufacturing the products from the received components, and a shipping process 106 for shipping the finished products. Each of these processes may occur at different locations within a factory. For example, intake process 102 may occur at a location associated with an intake department 108 of the factory, manufacturing process 104 may occur at a location associated with a manufacturing department 110 of the factory, whereas shipping process 106 may occur at a location associated with a shipping department 112 of the factory. Although FIG. 1 illustrates that one process occurs at each of these locations, it is understood that multiple processes may also occur at each of these locations. Moreover, it is understood that embodiments of the present disclosure can be used for other processes, such as supply chain management processes, logistics management processes, etc.

Moreover, each of intake process 102, manufacturing process 104, and shipping process 106 may also include a set of sub-processes. For example, intake process 102 may include a sub-process 102a for receiving packages of components, a sub-process 102b for removing the components from the packages, and a sub-process 102c for checking defects in the received components. Also, manufacturing process 104 may include a sub-process 104a for a first manufacturing step (e.g., step "A"), a sub-process 104b for a second manufacturing step (e.g., step "B"), etc., followed by a sub-process 104n for performing quality check on the finished products. Further, shipping process 106 may include a sub-process 106a for putting the finished products into packages, and a sub-process 106b for shipping the packages of the finished products.

A group of sensors can be deployed at the factory to monitor the processes and sub-processes of manufacturing operation 100, to generate data that can be used to improve manufacturing operation 100. For example, to improve the efficiency of intake process 102, sensors can be deployed at intake department 108 to track a speed of movement of the components. For example, each component may carry an RFID tag to emit wireless signals carrying certain information (e.g., an identification code such as a stock keeping unit (SKU) number, an Electronic Product Code (EPC), etc.). A set of wireless sensors can be deployed at intake department 108 to detect the wireless signals, and generate sensor data indicating the detection of the wireless signals. The sensor data and the associated timestamps can be transmitted to a server for processing. As another example, the sensors may also be audio sensors configured to collect audio signals generated by the movement of the components. The audio signals data can also be transmitted to a server, which can analyze the audio signals to detect the movement of the components. The server can post-process the sensor data and the timestamps to generate information about, for example, a rate of components passing through a particular location within intake department 108 between particular sub-processes (e.g., between sub-process 102a in which the packages of components are received and sub-process 102b in which the components are removed from the packages). The server can also generate information about, for example, a distribution of the rates among different components (e.g., based on different SKUs or other identification information), etc. Based on the rate of movement information, one or more bottlenecks within intake process 102 can be identified, and appropriate actions can be taken to remove or at least improve the bottlenecks.

Although some of the sensor data generated by the deployed sensors can be useful in identifying and/or monitoring the bottlenecks within manufacturing operation 100, some of the data may be unrelated to the bottlenecks, or are not needed by the user, and those data need not be provided to the server and/or the user. For example, assuming the bottlenecks are in intake process 102, the sensor data provided by the sensors deployed at manufacturing department 110 and at shipping department 112 may provide no useful information about the bottlenecks in intake process 102, and need not be post-processed to generate the rate of movement information. As another example, a user investigating the efficiency of intake process 102 may also not need the sensor data provided by the sensors deployed at manufacturing department 110 and at shipping department 112. Therefore, the sensor data from department 110 and at shipping department 112 also need not be sent to the user (e.g., to a mobile device and/or a personal computer operated by the user).

To provide a user with an efficient and intuitive way of selecting a set of sensor data to be received by the server (and/or by the user), the sensor network, and the labelling of the sensor data generated by the sensor network, can be organized in a hierarchical form. The hierarchical form can be based on a hierarchy of processes and/or components of a subject for which sensor data is collected, and each sensor can be assigned a hierarchical label to reflect the hierarchy. As to be discussed in more details below, the user can manage the forwarding of sensor data by a sensor data dispatcher based on the hierarchical labels.

Figure 2A:
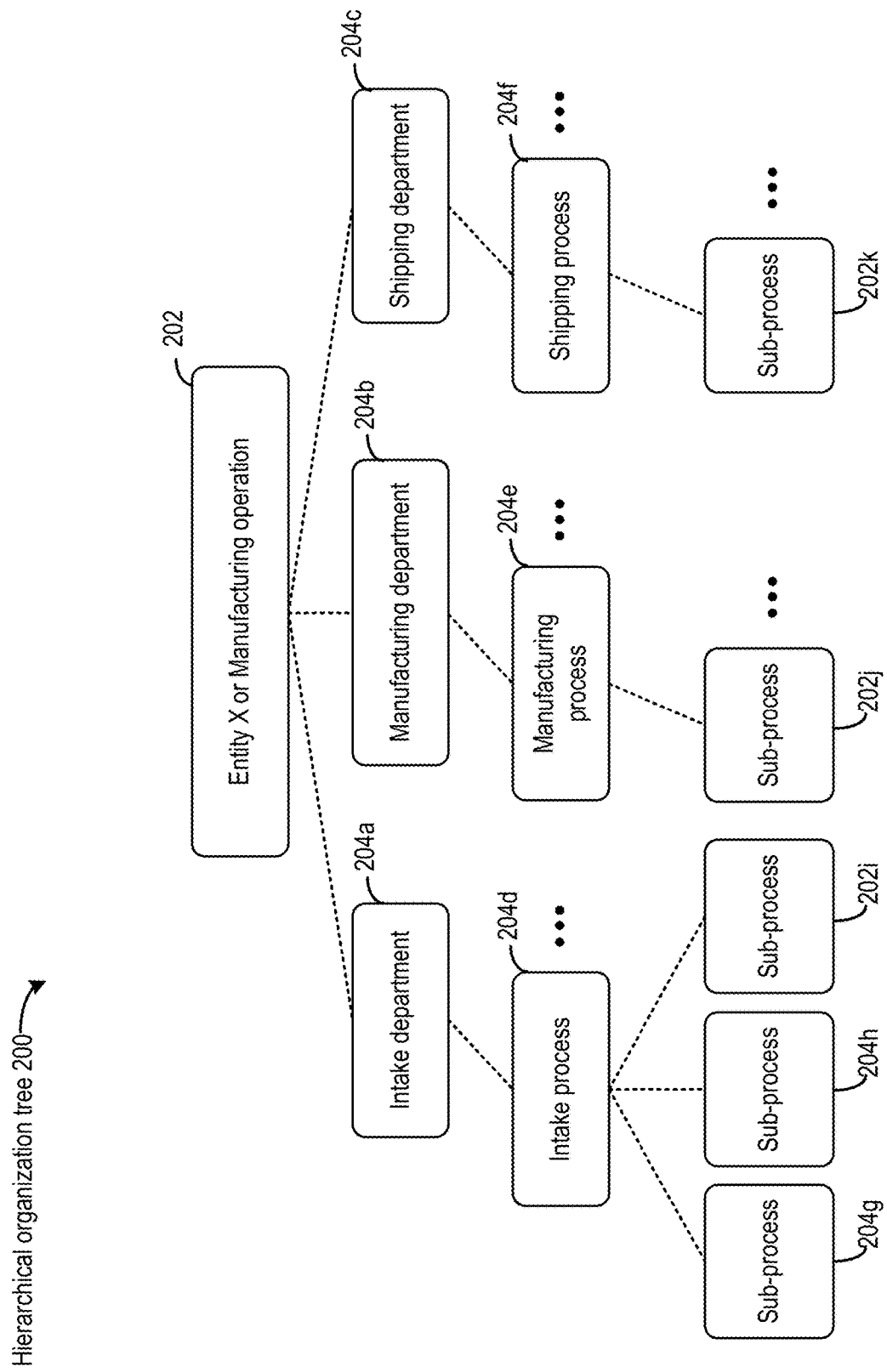
FIG. 2A and FIG. 2B illustrate part of a hierarchical organization tree of the operation of FIG. 1 and part of a corresponding hierarchical sensor network.

FIG. 2A illustrates part of hierarchical organization tree 200 of manufacturing operation 100. As shown in FIG. 2A, tree 200 has a top node 202 and a number of child nodes 204a-204k. Top node 202 may be associated with an operation (e.g., manufacturing operation 100), or an entity (e.g., entity X) responsible for the manufacturing operation. The child nodes may be associated with the locations within the factory (e.g., child node 204a being associated with intake department 108), the processes (e.g., child node 204d being associated with intake process 102), and the sub-processes (e.g., child node 204g being associated with sub-process 102a) that are performed in each of the locations. A group of sensors deployed to obtain sensor data for the sub-processes of manufacturing operation 100 can be organized based on tree 200 to form a hierarchical sensor network. The organization can be based on, for example, assigning a hierarchical label (or identifier) to each sensor, which connotes the hierarchical organization information.

Figure 2B:
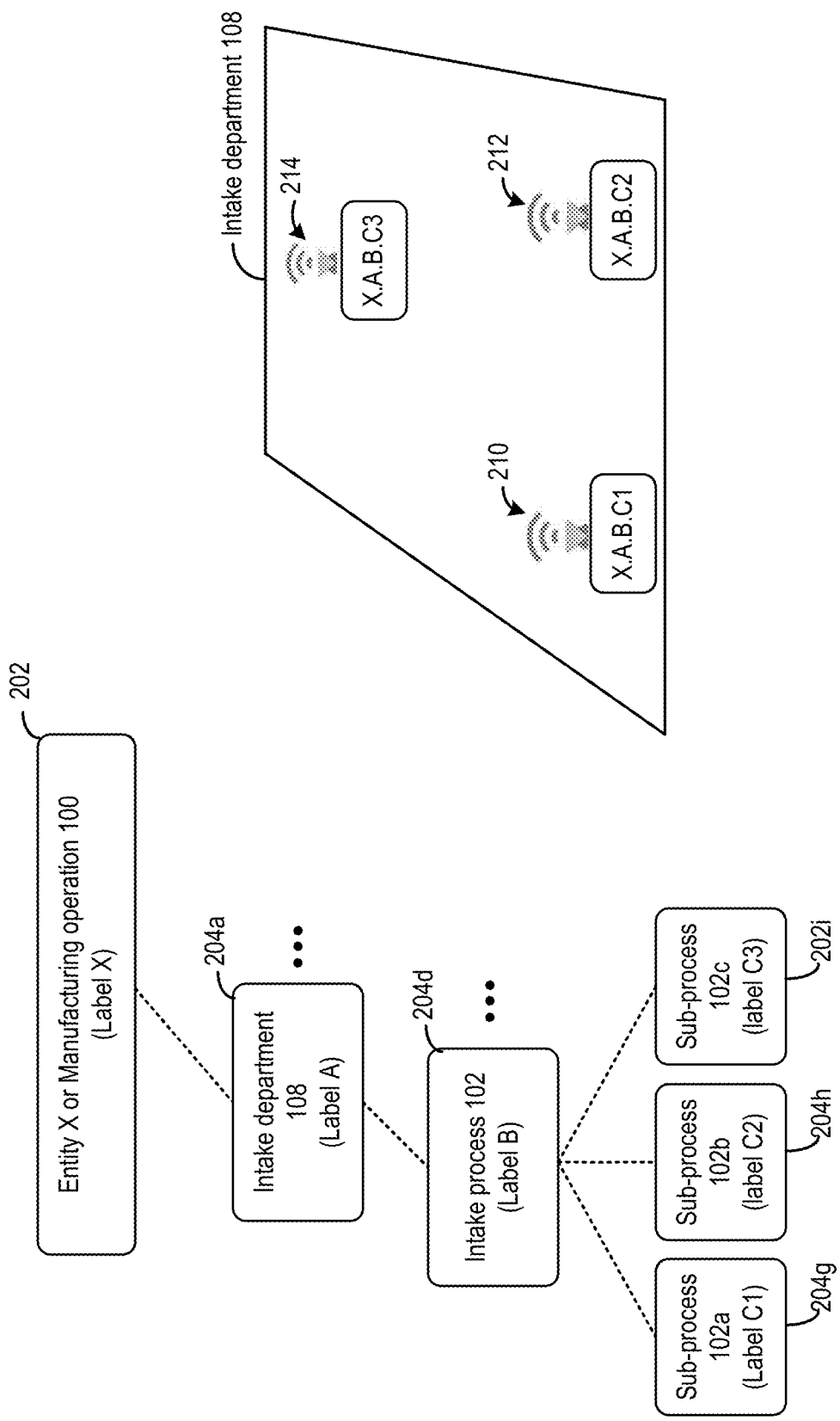

FIG. 2B illustrates an example of a hierarchical labelling scheme. On the left is part of hierarchical organization tree 200. In the example of FIG. 2B, top node 202 (which represents entity X or manufacturing operation 100) can be associated with a label X. Child node 204a (which represents intake department 108) may be associated with a label A. Child node 204d (which represents intake process 102) may be associated with a label B. Child nodes 204g, 204h, and 204i (which represent sub-processes 102a, 102b, and 102c) may be associated with, respectively, labels C1, C2, and C3.

Sensors deployed to obtain sensor data for the sub-processes performed by an entity at a particular location can be assigned a hierarchical label generated based on the labels of the nodes in tree 200. The labels can be arranged following an order to connote a parent-child relationship. For example, two adjacent labels in the hierarchical label may represent a parent node and its immediate child node in tree 200, with the label on the left being associated with the parent node and the label on the right being associated with the child node. For example, as shown on the right, three sensors 210, 212, and 214 are deployed at intake department 108. Sensor 210 may be configured to obtain sensor data for sub-process 102a (labelled C1) and may be associated with a hierarchical label "X.A.B.C1," where label X is associated with the top node (entity X or manufacturing operation 100), label A (intake department 108) being associated with the child node of X, label B (intake process 102) being associated with the child node of A, and C1 (sub-process 102a) being associated with the child node of B. With a similar scheme, sensor 212, which is configured to obtain sensor data for sub-process 102b (labelled C2), may be associated with a hierarchical label "X.A.B.C2." Further, sensor 213, which is configured to obtain sensor data for sub-process 102c (labelled C3), may be associated with a hierarchical label "X.A.B.C3" as well.

Hierarchical organization tree 200 provides a user a structured way to select a set of sensor data to be received by the server (and/or by the user), which enables the selection to be made in an efficient and intuitive way. As an illustrative example, a user can identify a particular entity (e.g., entity X) from which he or she desires to receive sensor data. After identifying the entity, the user can traverse hierarchical organization tree 200 starting from the top node representing entity X, identify a location within the entity (e.g., intake department 108), identify a process being performed at that location (e.g., intake process 102), and then select a sub-process of that process (e.g., sub-process 102a), for which the user desires to monitor. The user can then receive sensor data only from sensor 210, which is deployed for monitoring of sub-process 102a as discussed above.

II. Sensor Data Distribution System

The sensors deployed at different locations and for different processes and sub-processes can transmit sensor data to a distribution system, which can distribute the sensor data to consumers of the sensor data. The consumers of the sensor data can include, for example, users, analytics software, etc. The distribution system may receive a request from a consumer for sensor data generated by a particular sensor (or group of sensors), and the distributed system can forward only the requested sensor data to the consumer. The distributed system may also perform additional post-processing and formatting of the sensor data to, for example, facilitate the display of the sensor data to the user.

Figure 3:
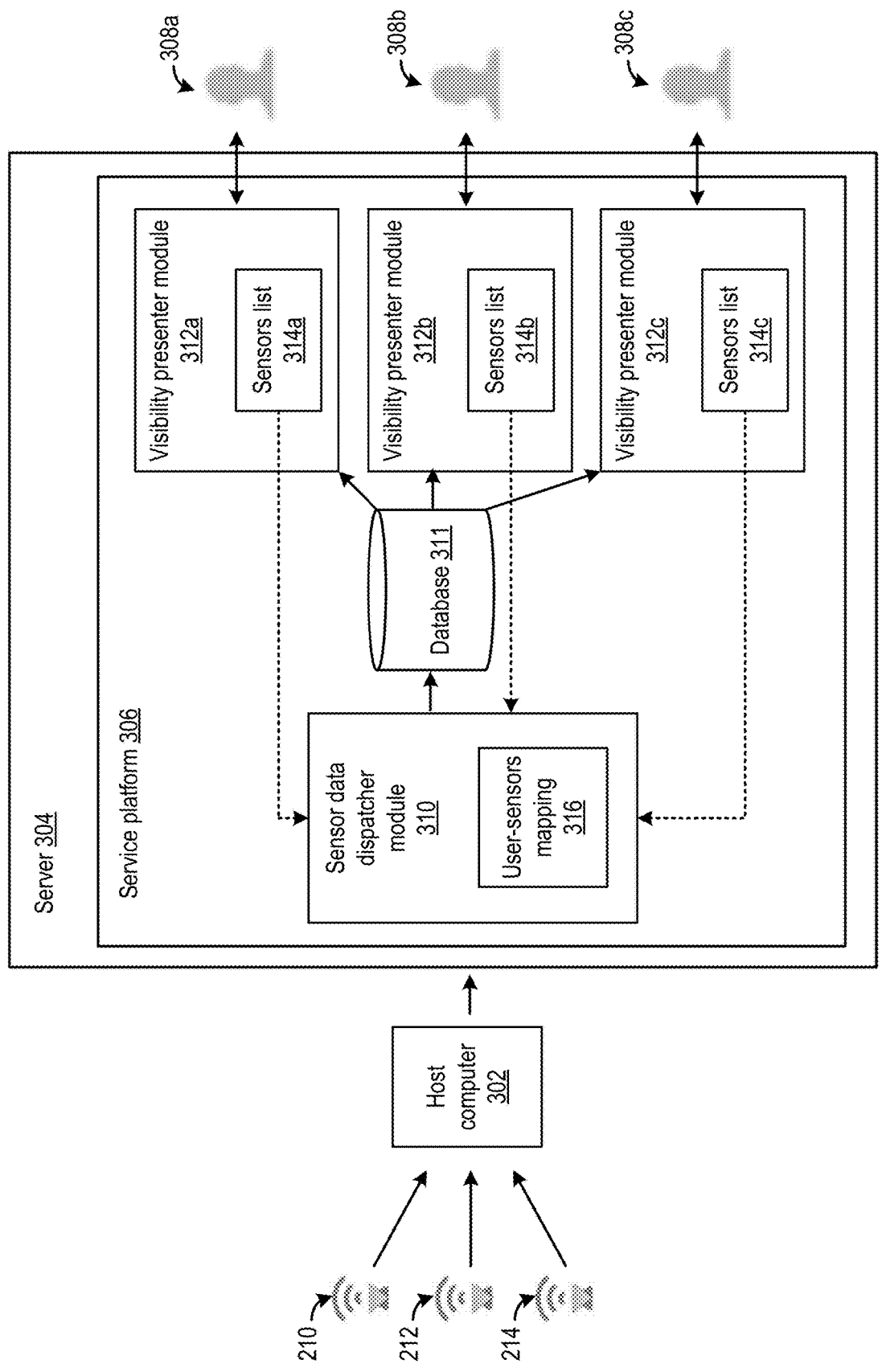
FIG. 3 illustrates an example sensor data distribution system according to embodiments of the present disclosure.

FIG. 3 illustrates an example sensor data distribution system 300 to distribute sensor data received from a set of sensors to a set of users. As shown in FIG. 3, sensor data distribution 300 includes a set of sensors (e.g., sensors 210, 212, and 214 of FIG. 2B), one or more host computers 302, and one or more servers including server 304. Host computers 302 may receive raw sensor data from sensors 210, 212, and 214, package the raw sensor data into structured sensor data according to pre-determined data schemas, and transmit the structured sensor data for each sensor to server 304.

Server 304 may include a service platform 306 to receive the structured sensor data from the host computer 302, and to provide the structured sensor data to a client device (e.g., a mobile phone, a terminal, etc.) operated by each of users 308a, 308b, and 308c. Server 304 may establish a communication channel (e.g., TCP/IP channel) with the client devices, and transmit the structured sensor data to the client devices based on, e.g., the HTTP protocol. The structured sensor data can be provided based on a selection by the users. Specifically, service platform 306 includes a sensor data dispatcher module 310, and a set of visibility presenter modules 312a, 312b, and 312c. Each of these modules can be software. Sensor data dispatcher module 310 receives structured sensor data from host computers 302, and forward the structured sensor data to a database 311.

Visibility presenter modules 312a, 312b, and 312c can obtain the structured data from database 311 based on the selections of users 308a, 308b, and 308c respectively. Each of visibility presenter modules 312a, 312b, and 312c can provide the structured sensor data for displaying to the users. Each of visibility presenter modules 312a, 312b, and 312c may receive a selection from a respective user about which sensor(s) the user wishes to receive data from, and generate a sensor list (e.g., sensor lists 314a, 314b, or 314c) including the selected sensor information. The selected sensor information may include, for example, a hierarchical label of the selected sensor as discussed above. Each of visibility presenter modules 312a, 312b, and 312c may forward the respective sensors lists 314a, 314b, and 314c (represented by dotted arrows) to sensor data dispatcher module 310, which maintains a user-sensors mapping 316 based on the sensor lists. Sensor data dispatcher module 310 can forward the structured sensor data to visibility presenter modules 312a, 312b, and 312c based on user-sensors mapping 316.

A. Host Computer

Host computer 302 provides an interface between sensor devices (e.g., sensor devices 210, 212, and 214) and servers 304. Host computer 302 may include any hardware system capable of performing computations (e.g., general purpose central processing units (CPU), microcontrollers, field-programmable gate array (FPGA), etc.). In some examples, host computer 302 can be a standalone system (e.g., a personal computer, a laptop, etc.) that can communicate with the sensor devices over a network (e.g., Wi-Fi, Bluetooth, Ethernet, etc.). In some examples, host computer 302 can be part of a platform that includes a sensor device, such as Raspberry Pi. Host computer 302 may operate a set of software applications to perform the interface functions between sensor devices and servers 304.

Figure 4:
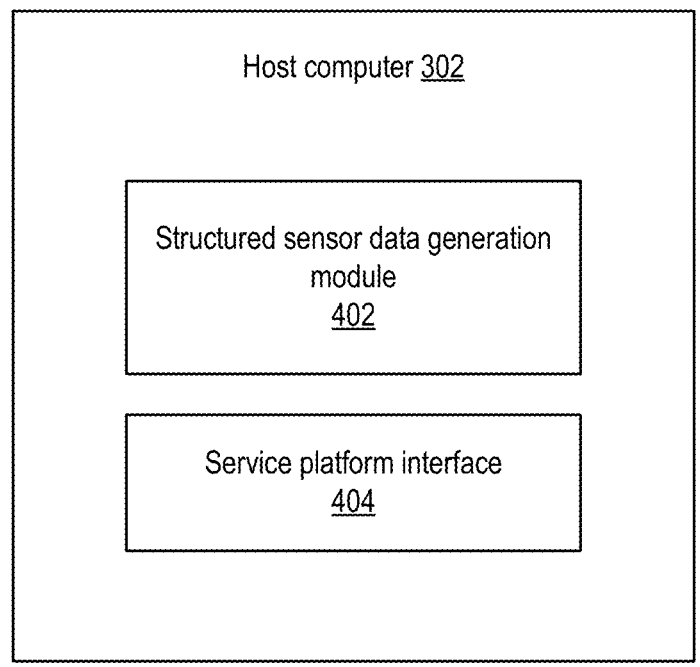
FIG. 4 shows an example host computer according to embodiments of the present invention.

FIG. 4 illustrates some of the software components of host computer 302, which includes a structured sensor data generation module 402 and a service platform interface 404.

Structured sensor data generation module 402 can obtain raw sensor data received from sensors (e.g., EPC, SKU, indications of detection of an object, etc.), and transform the raw sensor data into structured sensor data based on a pre-determined data schema. The transformation may include adding information including, for example, the hierarchical labels of the sensor that generates the raw sensor data, timestamp information of the raw sensor data, or other related information. The added information can be used by sensor data dispatcher module 310 to determine whether to forward the structured sensor data to a particular user. The additional information can also be used by visibility presenter modules 312a-312c to perform additional processing and formatting for displaying to the user.

1. Data Schema

Figure 5:
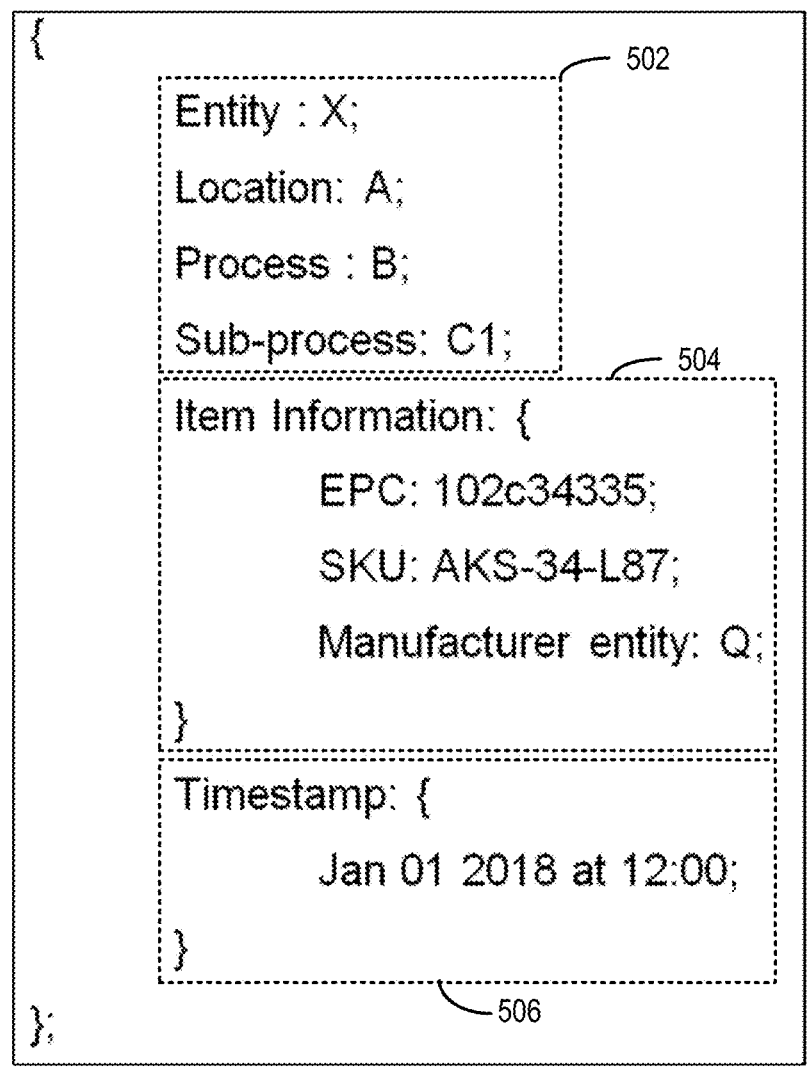
FIG. 5 shows examples of structured sensor data based on an example data schema according to embodiments of the present invention.

FIG. 5 illustrates an example of structured sensor data 500 generated by host computer 302. In the example of FIG. 5, structured sensor data 500 includes multiple fields including, for example, fields 502, 504, and 506. For example, fields 502 can identify an entity, a location, a process, and a sub-process associated with the sensor that generates the information included in structured sensor data 500. Moreover, fields 504 include item information generated based on raw sensor data. For example, the sensor may be configured to transmit signals representing EPC and SKU codes of an object, which the sensor received from an RFID tag of the object. Host computers 302 can receive the signals, determine that the signals represent EPC and SKU codes (e.g., by looking for specific patterns), and insert the determined EPC and SKU codes into fields 504. Host computers 302 may also access external information (e.g., from an external database) and determine the manufacturer of that object, and include the manufacture information in fields 504. Further, fields 506 include timestamp information associated with the raw sensor data. As to be discussed below, the information included in fields 504 and 506 can be used by visibility presenter modules 312a-312c to perform post-processing and filtering operations.

2. Communication with Service Platform

Referring back to FIG. 4, host computer 302 also includes service platform interface 404 to transmit the structured sensor data (e.g., structured sensor data 400) to service platform 306. In some examples, service platform interface 404 (of host computer 302) may establish a communication channel (e.g., a Transmission Control Protocol/Internet Protocol (TCP/IP) channel) with server 304, and transmit data packets including the structured sensor data using the Hypertext Transfer Protocol (HTTP) protocol to server 304. In some examples, server 304 may host a web service (e.g., a RESTful web service) which can be part of sensor data dispatcher module 310, and service platform interface 404 may include the structured sensor data as a data object (e.g., a JavaScript Object Notation (JSON) object) in an HTTP POST command, and transmit the HTTP POST command to server 304. Upon receiving the HTTP POST command, the web service hosted at server 304 can provide the data to service platform 306.

In some examples, on top of the HTTP protocol, service platform interface 404 may also interface with a real-time message processor, such as a message-oriented middleware (MOM). A MOM can be software and/or hardware infrastructures supporting sending and receiving messages between a plurality of computing systems. Service platform interface 404 may transmit the structured sensor data as messages to the MOM, which then forwards the messages to service platform 306. Examples of MOM may include, for example, ActiveMQ™, MQTT™, RabbitMQ™, Socket.IO™, etc.

An MOM can facilitate the transmission of the structured sensor data in several ways. First, the MOM may support asynchronous messaging, where the MOM can process a request from service platform interface 404 to transmit a message as soon as the message is received and without sending a response to service platform interface 404. The MOM may also include message queues to buffer the received messages in case the MOM is not able to send out the messages immediately. Asynchronous messaging can improve the efficiency of service platform interface 404 by not having service platform interface 404 to wait for (or to keep track of) an acknowledgment response from the MOM before sending the next set of sensor data, which allows host computer 302 to send sensor data to service platform 306 whenever host computer 302 receives new raw sensor data and generates new structured sensor data. This can improve the timeliness of the transmission of the sensor data and allows the users to receive the sensor data in substantially real time.

Moreover, the MOM can also support automatic pushing of messages to the user without the user requesting for the messages, which can further reduce the delay in transmitting the messages to the user. For example, the MOM may provide a message topic subscription service, which enables service platform 306 to subscribe to messages associated with a particular topic selected by a user (e.g., one of users 308a, 308b, or 308c). The topic can be related to certain attributes of the messages, such as the sensor that generates the messages. In this example, the topic can be a particular hierarchical label of a sensor. As part of the message topic subscription service, the MOM can receive a message including structured sensor data originated from host computer 302, and determines whether the message matches a topic (e.g., based on whether fields 502 of structured sensor data matches the hierarchical label included in the topic) selected by the user. If the message matches the topic selected by the user, the MOM can transmit the message addressed to a visibility presenter module associated with the user (e.g., visibility presenter module 312a of user 308a). This enables server 304 (and the user) to receive the most-to-date sensor data. In some examples, the MOM can be expanded to provide a multicast system, which enables a message to be addressed and pushed to multiple users, which can further facilitate the transmission of the sensor data to the users.

B. Service Platform

Service platform 306 may receive structured sensor data from host computer 302 (e.g., via an MOM), and can provide the structured sensor data to the users based on the selection by the users.

Figure 6:
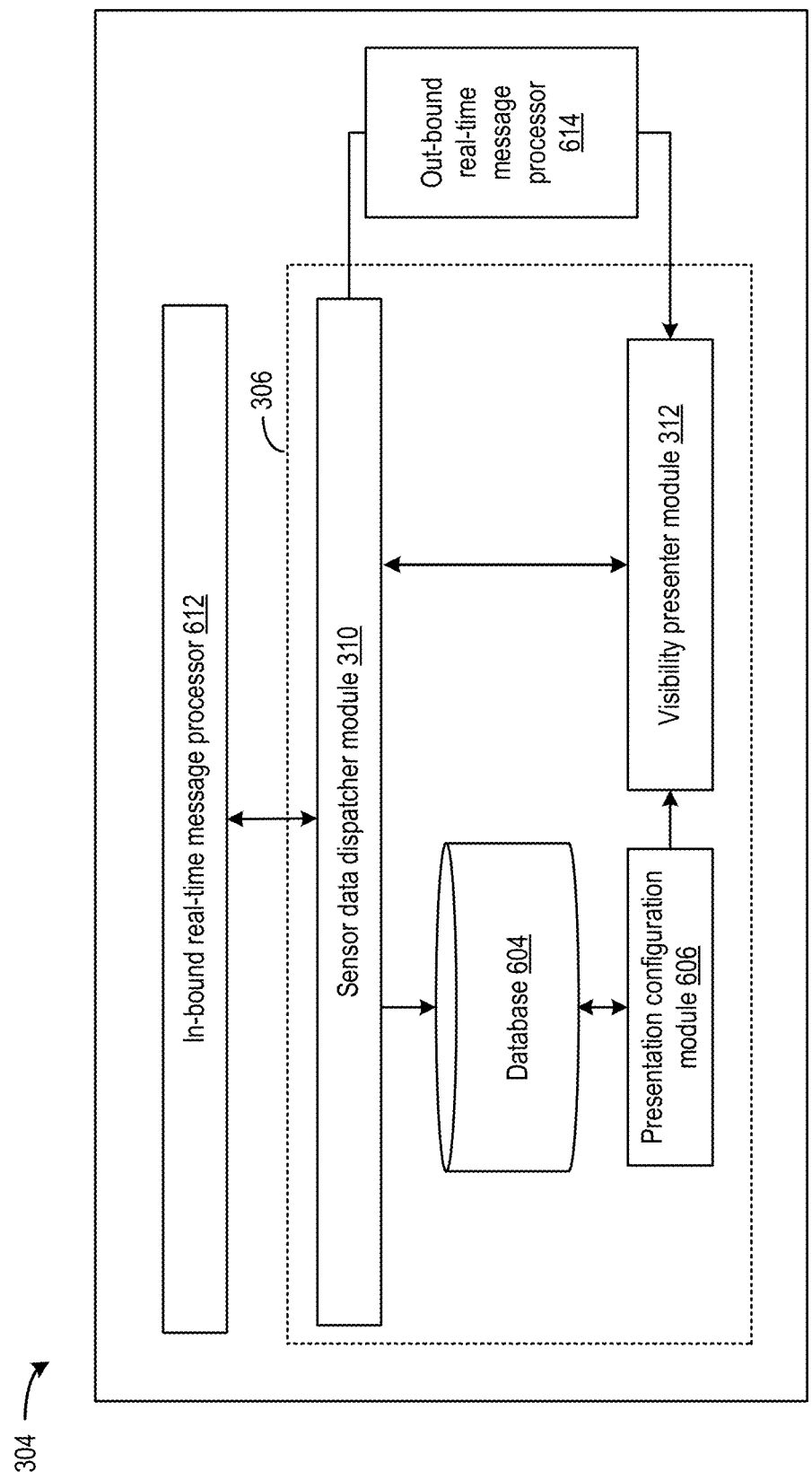
FIG. 6 shows an example service platform according to embodiments of the present disclosure.

FIG. 6 illustrates additional details of some of the internal components of service platform 306. In addition to sensor data dispatcher module 310 and visibility presenter module 312 (e.g., one of visibility presenter modules 312a-312c of FIG. 3), service platform 306 further includes a database 604, and a presentation configuration module 606. In addition, server 304 may also include an in-bound real-time message processor 612 and an out-bound real-time message processor 614, both of which can be part of, or external to, service platform 306. Both in-bound real-time message processor 612 and out-bound real-time message processor 614 can be MOM as discussed above.

1. Sensor Data Dispatcher Module

Sensor data dispatcher module 310 may receive structured sensor data from host computer 302 and provide the structured sensor data to the user. Sensor data dispatcher module 310 can be configured to only forward sensor data from a set of sensors selected by the users. For example, as discussed above, sensor data dispatcher module 310 may receive a sensor list (e.g., sensor list 314a) associated with a user (e.g., user 308a) from visibility presenter module 312. The sensor list may identify a set of sensors from which the user would like to receive the structured sensor data, and may include a set of hierarchical labels associated with the sensors. Sensor data dispatcher module 310 may determine user-sensors mapping 316 by mapping a user to a set of hierarchical labels (of the sensors) included in the sensor list of the user.

There are different ways by which sensor data dispatcher module 310 can use user-sensors mapping 316 to control the forwarding of the structured sensor data to the users. In some examples, sensor data dispatcher module 310 may deploy a RESTful web service and may receive structured sensor data as part of an HTTP command (e.g., an HTTP push command) transmitted by host computer 302. Upon receiving the structured sensor data, sensor data dispatcher module 310 can compare certain fields included in the received structured sensor data (e.g., fields 502) against the set of hierarchical labels included in user-sensors mapping 316, to see if a matching hierarchical label can be found in user-sensors mapping 316. Sensor data dispatcher module 310 can forward the structured sensor data to visibility presenter module 312 if a matching hierarchical label can be found. On the other hand, if no matching hierarchical label can be found, sensor data dispatcher module 310 can also store the structured sensor data at database 604 for later retrieval.

In some examples, sensor data dispatcher module 310 may also receive structured sensor data as messages from a MOM such as, for example, in-bound real-time message processor 612. Sensor data dispatcher module 310 may also obtain a default topic list such as, for example, based on a list of sensors deployed to monitor manufacturing operation 100, and subscribe to that default topic list. The default topic list can be provided by, for example, a user, an administrator of the sensor network, etc. The default topic list can be updated when, for example, a sensor in the sensor network is enabled (or added) or disabled (or removed). Based on the default topic list, in-bound real-time message processor 612 can transmit messages containing sensor data from the list of sensors to sensor data dispatcher module 310. Sensor data dispatcher module 310 can then determine which of received messages are to be forwarded to the user based on user-sensors mapping 316, which can be generated based on sensors lists 314 received from visibility presenter module 312. Based on the user-sensors mapping 316, which reflect which sensor a user selects to receive sensor data, sensor data dispatcher module 310 can forward messages from the selected sensor(s) to that user.

There are also different ways by which sensor data dispatcher module 310 can provide the structured sensor data to the users. For example, sensor data dispatcher module 319 can store the structured sensor data (and/or the messages including the structured sensor data) at database 604 as part of an event log. The event log may include, for example, timing information of different events. The timing information can be derived from the timestamp (e.g., fields 506) included in the structured sensor data, whereas the event information can be derived from the item information (e.g., fields 504) included in the structured sensor data. Each event may also be associated with a hierarchical sensor label for the sensor that provides sensor data for the event. The event log can be acquired by visibility presenter module 312 based on the hierarchical sensor label (e.g., of sensor list 314a) to generate or update a file (e.g., a document in the format of Hypertext Markup Language (HTML), Extensible Markup Language (XML), etc.), and the file data can be provided to a graphical user interface (e.g., a web browser) for displaying to the users. Based on the user's operations at visibility presenter module 312, one or more queries can be transmitted to database 604 to acquire the event data, and portions of the HTML or XML file associated with the displaying of the event log can be updated and provided to the graphical user interface for displaying.

As another example, sensor data dispatcher module 310 can also send the structured sensor data to out-bound real-time message processor 614, which can push messages including the structured sensor data to the users via visibility presenter module 312. For example, out-bound real-time message processor 614 can also be a MOM and can push messages asynchronously to the users based on the user's subscription to a topic related to the messages (e.g., based on the hierarchical label). Visibility presenter module 312 can intercept the message for a user (e.g., by detecting a predetermined HTTP PUSH command associated with the transmission of the message), extract the fields content from the message, and update portions of an HTML or an XML file corresponding to the extracted fields content to be provided to the graphical user interface for displaying.

2. Sensor Data Selection and Displaying

Presentation configuration module 606 allows the user to select, via a graphical user interface (e.g., a browser), which sensor(s) of which the sensor data are to be provided by visibility presenter module 312 for displaying. Visibility presenter module 312 can provide the sensor data for displaying to the user based on the selection.

Figure 7:
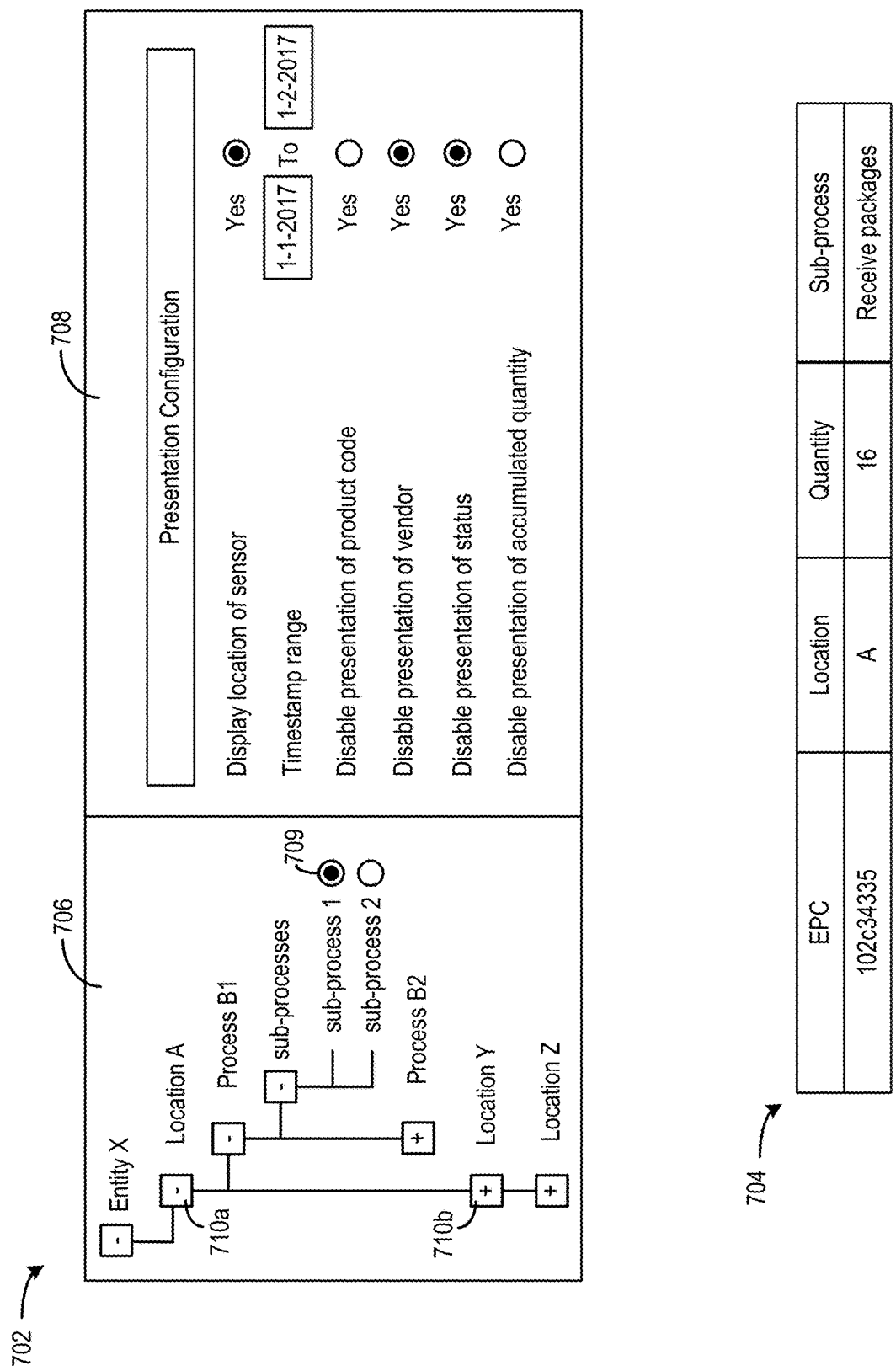
FIG. 7 shows examples of interfaces for selecting the sensors and displaying the sensor data of the selected sensors according to embodiments of the present disclosure.

FIG. 7 illustrates examples of interfaces 702 and 704 for selecting the sensors and displaying the sensor data of the selected sensors. Both interfaces 702 and 704 can be displayed and operated at a client device communicatively coupled with servers 304. Interface 702 includes a section 706 and a section 708. Section 706 displays one or more trees to represent one or more sensor network hierarchies. In the example of FIG. 7, section 706 may display one or more sensor network hierarchy trees including, for example, a hierarchy tree corresponding to hierarchical organization tree 200 of FIG. 2A, with a top node representing entity X and child nodes representing locations, processes, and sub-processes. Each sub-process in the tree is associated with a selectable element 709, which allows a user to select the sensor(s) within the sensor network hierarchy tree associated with the selected sub-processes for receiving the sensor data.

Section 706 also includes one or more activation elements 710 (e.g., activation elements 710a and 710b) to enable the user to collapse or expand a tree or different branches of the tree, so that multiple trees and/or multiple branches of the trees can be displayed for selection. Further, section 708 allows additional filtering and processing of the sensor data of the selected sub-processes. For example, the user may select a timestamp range of the sensor data to apply the processing (e.g., to accumulate the quantities of an item within the timestamp range). The user may also select to enable or disable displaying of certain information included in the sensor data, such as the location of the server, an identifier (e.g., a product code) of the item, etc.

Presentation configuration module 606 may detect the selections by the user at sections 706 and 708, and generate a configuration file to document the selections by that user.

For example, based on the selection of the sub-process(es) in section 706 and the hierarchical labels of the sensors associated with the selected sub-process(es), presentation configuration module 606 may store a listing of hierarchical labels (e.g., sensor list 314a) in the configuration file. Further, presentation configuration module 606 may also store the filtering and processing selections in the configuration file. The configuration file may be a text-based document, such as an XML document. The configuration file can also be stored at database 604 and mapped to a user, and can be retrieved by visibility presenter module 312.

Visibility presenter module 312 can provide the sensor data for displaying to the user based on the configuration file created by presentation configuration module 606. Visibility presenter module 312 can be activated when a user logs into server 304 to start a monitoring session (e.g., for manufacturing operation 100). Visibility presenter module 312 can acquire the configuration file associated with the user. From the configuration file, visibility presenter module 312 can obtain a listing of sensors (in the form of hierarchical labels), and provide the listing of sensors to sensor data dispatcher module 310, which enables sensor data dispatcher module 310 to forward structured sensor data from the sensors in the listing to visibility presenter module 312 by, for example, storing the sensor data at database 604 or forwarding the sensor data via out-bound real-time message processor 612. In a case where the sensor data is stored at database 604, visibility presenter module 312 can generate a query to obtain the sensor data from database 604 when receiving a request from the user to obtain the sensor data (e.g., by detecting an HTTP GET command from the user). In a case where the sensor data is transmitted via out-bound real-time message processor 614, visibility presenter module 312 can detect an HTTP PUSH command associated with transmission of the messages, and obtain the sensor data from the HTTP PUSH command.

Visibility presenter module 312 can also post-process the structured sensor data based on the selections of the user at section 708, and format the post-processed data into a file (e.g., generating a document in the format of Hypertext Markup Language (HTML), Extensible Markup Language (XML), etc.) for displaying in a graphical user interface. For example, visibility presenter module 312 may match timestamp field 506 in the structured sensor data with the selected timestamp range at section 708, and include only the sensor data with the matching timestamp field in the post-processing. Visibility presenter module 312 can extract information about an item from the sensor data based on a pre-determined schema (e.g., a schema defining the fields as illustrated in FIG. 5). For example, the sensor data may be structured based on the pre-determined scheme as illustrated in FIG. 5, and the extraction can be based on extracting information in various fields of the structured sensor data. The information may include, for example, product codes information, timestamp information, etc.

Visibility presenter module 312 can perform post-processing on the extracted information including, for example, determining a quantity of items detected by a sensor for the selected sub-process within the selected timestamp range. Visibility presenter module 312 can also customize the content of the document by including or omitting some of the sensor data (e.g., EPC information, location of the sensor, etc.) in the document. In some examples, Visibility presenter module 312 can include a table in the document to present the post-processed data. Interface 704 provides an example of a table generated by visibility presenter module 312 based on the selections in sections 706 and 708 at interface 702.

III. Method

Figure 8:
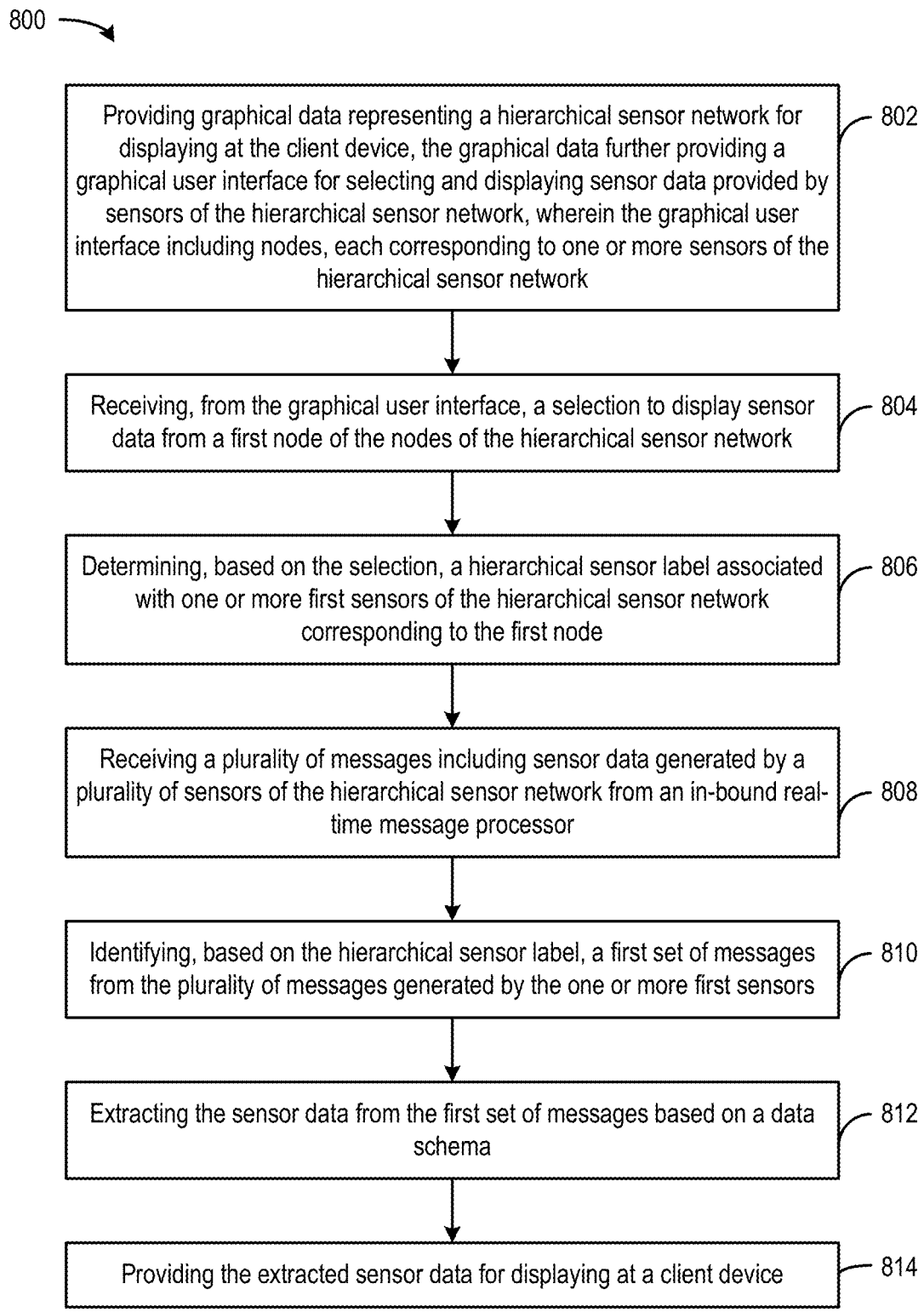
FIG. 8 is a flowchart of a method for operating a sensor network according to embodiments of the present invention.

FIG. 8 is a flowchart of a method 800 for operating a sensor network according to embodiments of the present invention. Method 800 can be performed by server 304, which can include one or more processors and a memory that stores program code for executing by the one or more processors.

At block 802, a server (e.g., server 304) provides graphical data representing a hierarchical sensor network for displaying at the client device, the graphical data further providing a graphical user interface for selecting and displaying sensor data provided by sensors of the hierarchical sensor network. The graphical user interface may include nodes, each corresponding to one or more sensors of the hierarchical sensor network. The graphical data may be provided by, for example, visibility presenter module 312 of server 304, and may cause the graphical user interface to display a tree representing the hierarchical sensor network, and the nodes may be nodes of the tree. The graphical data may also cause the graphical user interface to display one or more activation elements for collapsing or expanding the tree or different branches of the tree, and one or more selectable elements for selecting one or more nodes of the nodes. The graphical user interface may include, for example, a browser.

At block 804, the server receives, from the graphical user interface, a selection to display sensor data from a first node of the nodes of the hierarchical sensor network. The selection can be received by, for example, presentation configuration module 606 of server 304. The selection can be based on, for example, detecting a selectable element of the first node being selected at the graphical user interface.

At block 806, the server determines, based on the selection, a hierarchical sensor label associated with one or more first sensors of the hierarchical sensor network corresponding to the first node. For example, each node of the tree displayed in the graphical user interface may be associated with a label, and the hierarchical sensor label can be determined based on a combination of a label of the selected node and the labels of the parent nodes of the selected nodes within the tree.

At block 808, the server receives a plurality of messages including sensor data generated by a plurality of sensors of the hierarchical sensor network from an in-bound real-time message processor (e.g., in-bound real-time message processor 612). The messages can be received by sensor data dispatcher module 310, and the in-bound real-time message processor may be message-oriented middleware (MOM). The messages may be sent by, for example, host computer 302, which receives the sensor data from the plurality of sensors. The host computer and the MOM may have established a message topic subscription service, which sensor data dispatcher module 310 can subscribe to. The host computer can also transmit the messages to the MOM asynchronously. Upon receiving the messages, the MOM can forward the messages to sensor data dispatcher module 310.

At block 810, the server identifies, based on the hierarchical sensor label, a first set of messages from the plurality of messages generated by the one or more first sensors. For example, sensor data dispatcher module 310 may determine or obtain a list of sensors from which a user wishes to receive sensor data. The list of sensors may include the hierarchical sensor label determined at block 806 and can be provided by visibility presenter module 312 based on a configuration file generated by presentation configuration module 606. The configuration file can be generated based on the user's selection of a node at the graphical user interface at block 804. The first set of messages may be generated by one or more sensors with matching hierarchical sensor labels as the ones included in the list of sensors.

At block 812, the server extracts the sensor data from the first set of messages based on a data schema. The data schema may define a set of fields associated with different information, such as an item identifier (e.g., EPC code), the locations, processes, and sub-processes associated with the sensor that generates the sensor data, etc.

At block 814, the server may provide the extracted sensor data for displaying at a client device. The extracted sensor data can be post-processed and formatted by, for example, visibility presenter module 312, to generate a HTML document, which can be transmitted to the client device. In some examples, data of the HTML document can be transmitted to the client device based on an HTTP request. In some examples, some of the data of the HTML document (e.g., those extracted from the sensor) can be pushed to the client device asynchronously via an out-bound real-time message processor (e.g., out-bound real-time message processor 614).

IV. Example Device

Figure 9:
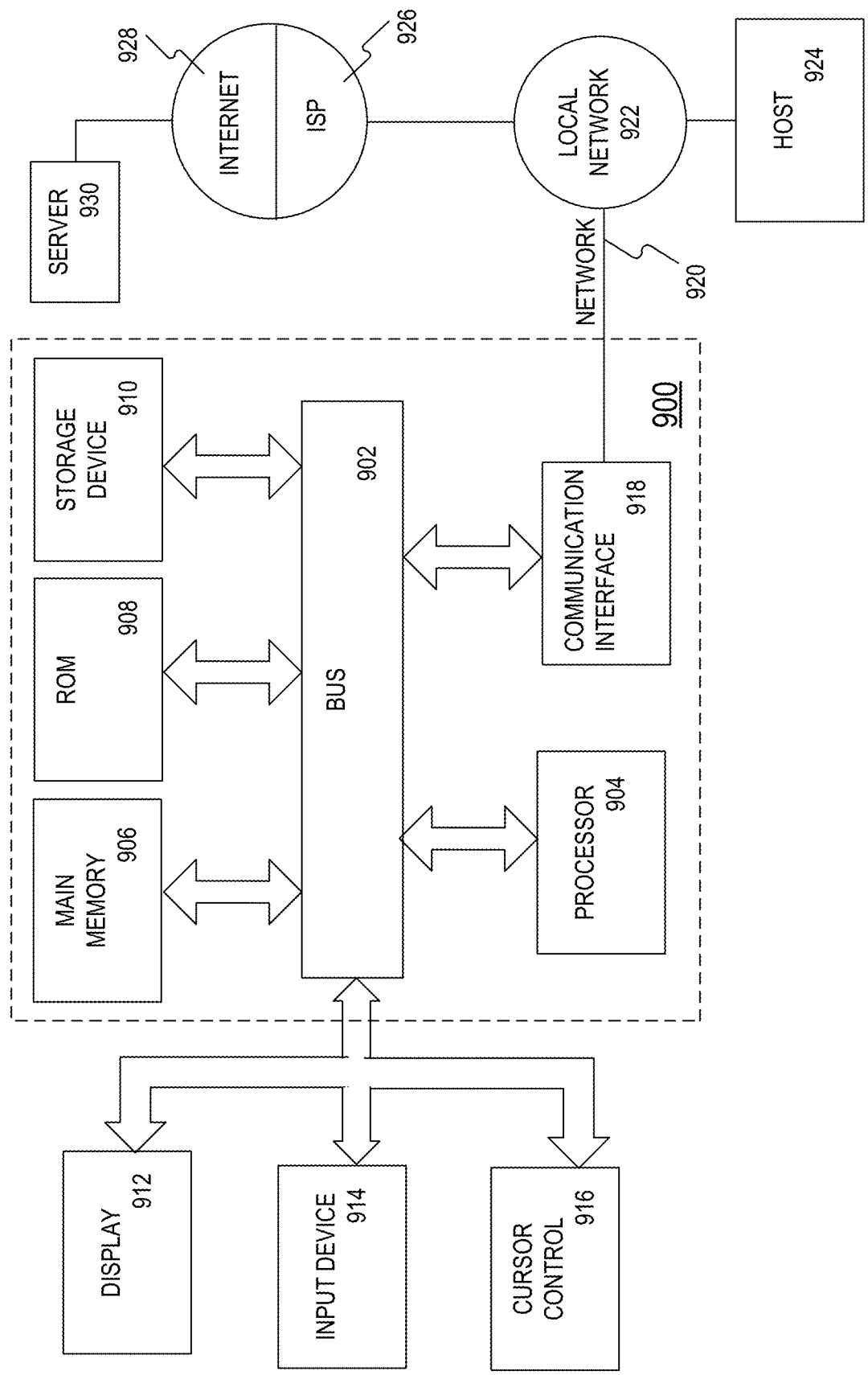
FIG. 9 is a block diagram of an example computer system.

FIG. 9 is a block diagram of an example computer system 900 with which embodiments described herein can be implemented, consistent with embodiments of the present disclosure. Computer system 900 includes a bus 902 or other communication mechanism for communicating information, and one or more hardware processors 904 (denoted as processor 904 for purposes of simplicity) coupled with bus 902 for processing information. Hardware processor 904 can be, for example, one or more microprocessors.

Computer system 900 also includes a main memory 906, such as a random access memory (RAM) or other dynamic storage device, coupled to bus 902 for storing information and instructions to be executed by processor 904. Main memory 906 also can be used for storing temporary variables or other intermediate information during execution of instructions to be executed by processor 904. Such instructions, after being stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

Computer system 900 can be coupled via bus 902 to a display 912, such as a cathode ray tube (CRT), a liquid crystal display (LCD), etc., for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen of display 912 without a cursor.

Computing system 900 can include a user interface module to implement a graphical user interface (GUI) that can be stored in a mass storage device as executable software codes that are executed by the one or more computing devices. This and other modules can include, by way of example, components, such as software components, object-oriented software components, class components and task components, processes, functions, fields, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

Computer system 900 can implement the techniques described herein using customized hard-wired logic, one or more ASICs or FPGAs, firmware and/or program logic which in combination with the computer system causes or programs computer system 900 to be a special-purpose machine. According to some embodiments, the operations, functionalities, and techniques and other features described herein are performed by computer system 900 in response to processor 904 executing one or more sequences of one or more instructions contained in main memory 906. Such instructions can be read into main memory 906 from another storage medium, such as storage device 910. Execution of the sequences of instructions contained in main memory 906 causes processor 904 to perform the process steps described herein. In alternative embodiments, hard-wired circuitry can be used in place of or in combination with software instructions.

The term "non-transitory media" as used herein refers to any non-transitory media storing data and/or instructions that cause a machine to operate in a specific fashion. Such non-transitory media can comprise non-volatile media and/ or volatile media. Non-volatile media can include, for example, optical or magnetic disks, such as storage device 910. Volatile media can include dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media can participate in transferring information between storage media. For example, transmission media can include coaxial cables, copper wire and fiber optics, including the wires that comprise bus 902. Transmission media can also take the form of acoustic or light waves, such as those generated during radio-wave and infra-red data communications.

Various forms of media can be involved in carrying one or more sequences of one or more instructions to processor 904 for execution. For example, the instructions can initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 can optionally be stored on storage device 910 either before or after execution by processor 904.

Computer system 900 can also include a communication interface 918 coupled to bus 902. Communication interface 918 can provide a two-way data communication coupling to a network link 920 that can be connected to a local network 922. For example, communication interface 918 can be an integrated services digital network (ISDN) card, cable modem, satellite modem, or a modem to provide a data communication connection to a corresponding type of telephone line. As another example, communication interface 918 can be a local area network (LAN) card to provide a data communication connection to a compatible LAN. Wireless links can also be implemented. In any such implementation, communication interface 918 can send and receive electrical, electromagnetic or optical signals that carry digital data streams representing various types of information.

Network link 920 can typically provide data communication through one or more networks to other data devices. For example, network link 920 can provide a connection through local network 922 to a host computer 924 or to data equipment operated by an Internet Service Provider (ISP) 926. ISP 926 in turn can provide data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, can be example forms of transmission media.

Computer system 900 can send messages and receive data, including program code, through the network(s), network link 920 and communication interface 918. In the Internet example, a server 930 can transmit a requested code for an application program through Internet 928, ISP 926, local network 922 and communication interface 918.

The received code can be executed by processor 904 as it is received, and/or stored in storage device 910, or other non-volatile storage for later execution. In some embodiments, server 930 can provide information for being displayed on a display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

Although the disclosure has been described with respect to specific embodiments, it will be appreciated that the disclosure is intended to cover all modifications and equivalents within the scope of the following claims.

A recitation of "a", "an" or "the" is intended to mean "one or more" unless specifically indicated to the contrary. The use of "or" is intended to mean an "inclusive or," and not an "exclusive or" unless specifically indicated to the contrary.

Reference to a "first" element does not necessarily require that a second element be provided. Moreover reference to a "first" or a "second" element does not limit the referenced element to a particular location unless expressly stated.

All patents, patent applications, publications, and descriptions mentioned herein are incorporated by reference in their entirety for all purposes. None is admitted to be prior art.

What is claimed is:

1. A computer-implemented method of operating a sensor network, the method comprising:
   providing, by a server to a client device, graphical data representing a hierarchical sensor network including a tree structure for displaying at the client device, the hierarchical sensor network configured to collect sensor data for monitoring a hierarchical operation involving at least one of a movement or a processing of one or more physical objects, the hierarchical operation being distributed across one or more locations and comprising processes and sub-processes, sensors of the hierarchical sensor network being organized into a hierarchy comprising the one or more locations, one or more processes being performed at each of the one or more locations, and one or more sub-processes of the one or more processes, the sensors being configured to generate sensor data based on arrival or departure of the one or more physical objects involved in one or more processes or one or more sub-processes at each of the one or more locations, the graphical data further providing a graphical user interface for selecting and displaying sensor data provided by sensors of the hierarchical sensor network, wherein the graphical user interface includes nodes, each node corresponding to a location, a process, or a sub-process of the hierarchical operation;
   receiving, by the server and from the graphical user interface, a selection to display the sensor data related to the tracking of the one or more physical objects for a first node of the nodes included in the graphical user interface;
   determining, by the server, a hierarchical sensor label associated with one or more first sensors of the hierarchical sensor network corresponding to the first node, the hierarchical sensor label being determined based on the selection, a first label of the first node, and a second label of a parent node of the first node within the tree structure;
   receiving, by the server, a plurality of messages including the sensor data related to the tracking of the one or more physical objects generated by a plurality of sensors of the hierarchical sensor network from an in-bound real-time message processor;
   identifying, by the server, a first set of messages from the plurality of messages generated by the one or more first sensors based on the hierarchical sensor label;
   extracting, by the server, the sensor data from the first set of messages based on a data schema; and
   providing, by the server, the extracted sensor data for displaying at the client device.

2. The method of claim 1, wherein the data schema includes one or more first identifiers associated with the one or more physical objects and a second identifier associated with a physical location of the one or more locations associated with the one or more first sensors,
   wherein the sensor data included in the plurality of messages includes the one or more first identifiers, and wherein the hierarchical sensor label includes the second identifier.

3. The method of claim 2, wherein the data schema further specifies one or more fields related to the one or more first identifiers and the second identifier, and wherein the extraction of the sensor data is based on the one or more fields.

4. The method of claim 1, further comprising:
   sending, by the server to the in-bound real-time message processor, a subscription request for receiving messages associated with one or more pre-determined criteria, the subscription request including at least the hierarchical sensor label as part of the pre-determined criteria, wherein the subscription request enables the in-bound real-time message processor to push a first message received from the one or more first sensors to a sender of the subscription request automatically; and
   receiving, by the server, the plurality of messages including the first set of messages based on the subscription request.

5. The method of claim 4, further comprising:
   storing, by the server, the plurality of messages at a data store;
   retrieving, by the server, the first set of messages associated with the hierarchical sensor label from the data store;
   converting, by the server, the sensor data extracted from the first set of messages to a format of a browser operating on the client device and based on the data schema; and
   providing, by the server, the converted sensor data for displaying at the graphical user interface at the client device.

6. The method of claim 5, further comprising:
   receiving, by the server, a request for the converted sensor data, wherein the converted sensor data is provided to the client device in response to receiving the request for the converted sensor data.

7. The method of claim 1, further comprising:
   detecting a push command associated with pushing of the first set of messages by an out-bound real-time message processor to the client device; and
   providing, by the server, the sensor data to the client device based on the detection of the push command.

8. The method of claim 7, further comprising:
   establishing, by the server, a communication channel with the client device for the pushing of the first set of messages by the out-bound real-time message processor to the client device.

9. The method of claim 1, wherein the hierarchical sensor network is a first hierarchical sensor network, the method further comprising:
   receiving, by the server from the client device, a request to obtain sensor data from a second hierarchical sensor network,
   wherein the second hierarchical sensor network corresponds to a second hierarchy of operations for the one or more physical objects, and
   wherein the second hierarchical sensor network is displayed as a different graphical element from the first hierarchical sensor network in the graphical user interface.

10. An apparatus comprising:
   a memory device that stores a set of instructions; and
   a hardware processor configured to execute the set of instructions to:
      provide, to a client device, graphical data representing a hierarchical sensor network including a tree structure for displaying at the client device, the hierarchical sensor network configured to collect sensor data for monitoring a hierarchical operation involving at least one of a movement or a processing of one or more physical objects, the hierarchical operation being distributed across one or more locations and comprising processes and sub-processes, sensors of the hierarchical sensor network being organized into a hierarchy comprising the one or more locations, one or more processes being performed at each of the one or more locations, and one or more sub-processes of the one or more processes, the sensors being configured to generate sensor data based on arrival or departure of the one or more physical objects involved in one or more processes or one or more sub-processes at each of the one or more locations, the graphical data further providing a graphical user interface for selecting and displaying sensor data provided by sensors of the hierarchical sensor network, wherein the graphical user interface includes nodes, each node corresponding to a location, a process, or a sub-process of the hierarchical operation;

receive, from the graphical user interface, a selection to display the sensor data related to the tracking of the one or more physical objects for a first node of the nodes included in the graphical user interface;

determine a hierarchical sensor label associated with one or more first sensors of the hierarchical sensor network corresponding to the first node, the hierarchical sensor label being determined based on the selection, a first label of the first node, and a second label of a parent node of the first node within the tree structure;

receive a plurality of messages including the sensor data related to the tracking of the one or more physical objects generated by a plurality of sensors of the hierarchical sensor network from an in-bound real-time message processor;

identify a first set of messages from the plurality of messages generated by the one or more first sensors based on the hierarchical sensor label;

extract the sensor data from the first set of messages based on a data schema; and provide the extracted sensor data for displaying at the client device.

11. The apparatus of claim 10,
wherein the data schema includes one or more first identifiers associated with the one or more physical objects and a second identifier associated with a physical location of the one or more locations associated with the one or more first sensors,
wherein the sensor data included in the plurality of messages include the one or more first identifiers, and
wherein the hierarchical sensor label includes the second identifier.

12. The apparatus of claim 11, wherein the data schema further specifies one or more fields related to the one or more first identifiers and the second identifier, and wherein the extraction of the sensor data is based on the one or more fields.

13. The apparatus of claim 10, wherein the hardware processor is further configured to execute the set of instructions to:
send, to the in-bound real-time message processor, a subscription request for receiving messages associated with one or more pre-determined criteria, the subscription request including at least the hierarchical sensor label as part of the pre-determined criteria, wherein the subscription request enables the in-bound real-time message processor to push a first message received from the one or more first sensors to a sender of the subscription request automatically; and
receive the plurality of messages including the first set of messages based on the subscription request.

14. The apparatus of claim 13, wherein the hardware processor is further configured to execute the set of instructions to:
store the plurality of messages at a data store;
retrieve the first set of messages associated with the hierarchical sensor label from the data store;
convert the sensor data extracted from the first set of messages to a format of a browser operating on the client device and based on the data schema; and
provide the converted sensor data for displaying at the graphical user interface at the client device.

15. The apparatus of claim 14, wherein the hardware processor is further configured to execute the set of instructions to:
receive a request for the converted sensor data, wherein the converted sensor data is provided to the client device in response to receiving the request for the converted sensor data.

16. The apparatus of claim 10, wherein the hardware processor is further configured to execute the set of instructions to:
detect a push command associated with pushing of the first set of messages by an out-bound real-time message processor to the client device; and
provide the sensor data to the client device based on the detection of the push command.

17. The apparatus of claim 16, wherein the hardware processor is further configured to execute the set of instructions to:
establish a communication channel with the client device for the pushing of the first set of messages by the out-bound real-time message processor to the client device.

18. The apparatus of claim 10, wherein the hierarchical sensor network is a first hierarchical sensor network;
wherein the hardware processor is further configured to execute the set of instructions to receive, from the client device, a request to obtain sensor data from a second hierarchical sensor network,
wherein the second hierarchical sensor network corresponds to a second hierarchy of operations for the one or more physical objects, and
wherein the second hierarchical sensor network is displayed as a different graphical element from the first hierarchical sensor network in the graphical user interface.

19. A non-transitory computer-readable medium having stored thereon instructions that, when executed by one or more processors, cause the one or more processors to:
provide, to a client device, graphical data representing a hierarchical sensor network including a tree structure for displaying at the client device, the hierarchical sensor network configured to collect sensor data for monitoring a hierarchical operation involving at least one of a movement or a processing of one or more physical objects, the hierarchical operation being distributed across one or more locations and comprising processes and sub-processes, sensors of the hierarchical sensor network being organized into a hierarchy comprising the one or more locations, one or more processes being performed at each of the one or more locations, and one or more sub-processes of the one or more processes, the sensors being configured to generate sensor data based on arrival or departure of the one or more physical objects involved in one or more processes or one or more sub-processes at each of the one or more locations, the graphical data further providing a graphical user interface for selecting and displaying sensor data provided by sensors of the hierarchical sensor network, wherein the graphical user interface includes nodes, each node corresponding to a location, a process, or a sub-process of the hierarchical operation;

receive, from the graphical user interface, a selection to display the sensor data related to the tracking of the one or more physical objects for a first node of the nodes included in the graphical user interface;

determine a hierarchical sensor label associated with one or more first sensors of the hierarchical sensor network corresponding to the first node, the hierarchical sensor label being determined based on the selection, a first label of the first node, and a second label of a parent node of the first node within the tree structure;

receive a plurality of messages including the sensor data related to the tracking of the one or more physical objects generated by a plurality of sensors of the hierarchical sensor network from an in-bound real-time message processor;

identify a first set of messages from the plurality of messages generated by the one or more first sensors based on the hierarchical sensor label;

extract the sensor data from the first set of messages based on a data schema; and provide the extracted sensor data for displaying at the client device.

20. The non-transitory computer-readable medium of claim 19, wherein the instructions, when executed by the one or more processors, cause the one or more processors to:

detect a push command associated with pushing of the first set of messages by an out-bound real-time message processor to the client device; and provide the sensor data to the client device based on the detection of the push command.

21. The method of claim 1, wherein the sensor data include physical quantities of an environment external to the hierarchical sensor network.

22. The method of claim 1, wherein the hierarchical sensor network is deployed within one or more buildings; and wherein the hierarchical sensor label reflects a physical location of the one or more locations of the one or more first sensors in a building of the one or more buildings.

23. The method of claim 1, wherein the sensor data include timestamps when the sensor data are collected by the one or more first sensors;

wherein the selection is a first selection;

wherein the method further comprises receiving, by the server and from the graphical user interface, a second selection to display a quantity of the one or more physical objects being tracked within a time period based on a subset of the sensor data collected within the time period; and wherein the subset of the sensor data is extracted from the sensor data based on the second selection and provided for displaying at the client device.

24. The method of claim 1, wherein the plurality of messages is a first plurality of messages;

wherein the sensor data is first sensor data; and wherein the method further comprises:

storing at least one of the selection or the hierarchical sensor label in a configuration file associated with a user of the client device;

identifying, by the server, a second set of messages from the plurality of messages generated by the one or more first sensors based on the configuration file;

extracting, by the server, second sensor data from the second set of messages based on the data schema; and providing, by the server, the extracted second sensor data for displaying at the client device.

25. The method of claim 1, wherein the hierarchical sensor network includes multiple tree structures; and wherein the method further comprises: receiving, by the server and from the graphical user interface, a first selection of the tree structure from the multiple tree structures and a second selection to display the sensor data from the first node of the nodes of the selected tree structure.

* * * * *